J. D. ALVORD.
PULLEY AND WHEEL CHUCKS FOR METAL TURNING-LATHES.
No. 184,688. Patented Nov. 28, 1876.
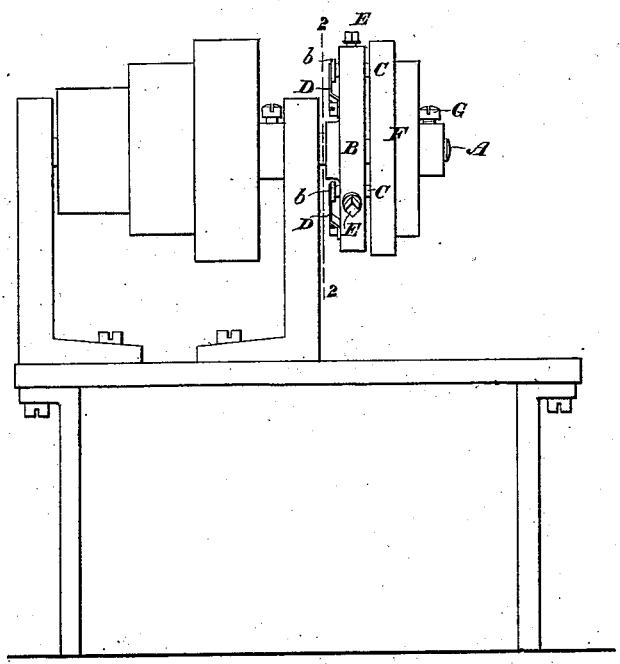
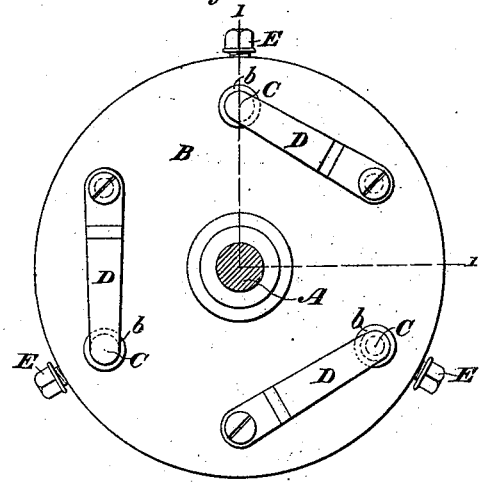
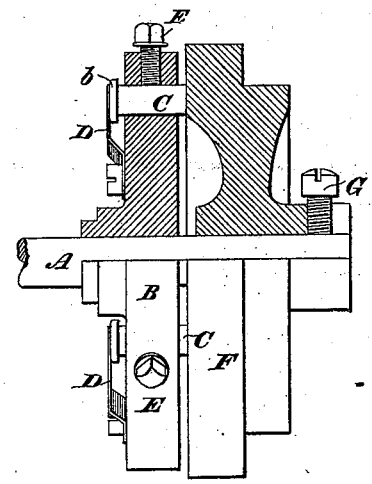
WITNESSES
INVENTOR
J D Alvord.
By his Attorneys
Baldwin, Hopkins & Peyton

UNITED STATES PATENT OFFICE.

JOSEPH D. ALVORD, OF BRIDGEPORT, CONNECTICUT.

IMPROVEMENT IN PULLEY AND WHEEL CHUCKS FOR METAL-TURNING LATHES.

Specification forming part of Letters Patent No. 184,688, dated November 28, 1876; application filed October 27, 1876.

*To all whom it may concern:*

Be it known that I, JOSEPH D. ALVORD, of Bridgeport, in the county of Fairfield and State of Connecticut, have invented certain new and useful Improvements in Machines for Turning Metal Wheels and Pulleys, of which the following is a specification:

My invention relates to a machine of that class employed in forming peripheral grooves in wheels, pulleys, &c., as well as to one adapted for use in connection with suitable cutters for both turning the faces or sides and peripheries of the wheels, &c.; and my improvements are especially applicable to a machine such as shown and described in Letters Patent of the United States, No. 180,409, granted me August 1, 1876, for machines for grooving metal pulleys.

My object is to provide simple means for adjusting and securing the wheel or pulley to be turned upon the spindle by which it is revolved, in such manner that when turned its side or face and its periphery shall be truly finished relatively to each other, and the peripheral groove or grooves, when formed therein, be exactly concentric with the axis thereof. The subject-matter claimed consists of certain novel constructions and combinations of parts, hereinafter specifically designated.

In the accompanying drawings, Figure 1 represents a longitudinal elevation of so much of a machine as is necessary to illustrate my invention; Fig. 2, a section through the spindle or shaft of the machine on the line 2 2 of Fig. 1, showing the rear of the chuck or centering-head on an enlarged scale; and Fig. 3, a section on the line 1 1 of Fig. 2, showing a wheel adjusted in position upon the spindle.

A shaft or spindle, A, supported and mounted as in my machine patented August 1, 1876, hereinbefore referred to, or in other suitable well-known ways, is provided with a chuck or holder, B, in advance of which its end projects. The chuck-head or centering-disk is provided with three or more openings, through which project stud bearings or pins C C C. These pins work endwise in their bearings in the chuck-head, which is of sufficient thickness to prevent any wabbling or sidewise movement of the pins. Yielding pressure upon the heads $b$ of the pins gives them a tendency to, at all times, move outward and endwise in their bearings in the chuck or centering-head. The pressure upon the pins is produced, in this instance, by plate-springs D D D, each secured at one end to the back of the chuck-head, and its opposite end bearing upon its respective yielding pin-head. The pins may be held unyieldingly at any desired position by adjustable clamps or set-screws E E E passing through the periphery of the chuck-head, or in other well-known ways.

When a wheel, F, is to be turned it is first drilled at the center and reamed out to form a bearing of a diameter adapted to fit snugly upon the outer end of the spindle A. It is then slipped upon the spindle and pushed back until its rear face, or that side adjacent to the chuck-head, comes in contact with the ends of all the yielding bearings C projecting through and in advance of the chuck. The pins yield to accommodate themselves to any inequalities in the surface of the wheel. The set-screws E, which had been previously loosened to allow the projecting bearings or pins to move endwise to adjust themselves against the wheel, are then tightened to fix the pins and afford a rigid bearing for the back of the wheel. A set-screw, G, passing through the wheel-hub, (or any other suitable retaining device,) is then adjusted to hold the wheel against movement endwise of the spindle and keep it up to the pins. The wheel is now ready to be revolved, and the turning of the periphery and face of the wheel is next proceeded with. Any suitable cutting devices may be employed for turning off the wheel face and periphery; but I prefer to form the groove or grooves in its periphery by the cutters and mechanism described in my before-mentioned patent of August 1, 1876. The spindle is revolved in any suitable well-known way.

From the foregoing description it will be seen that whether the back of a wheel or pulley to be turned is true or irregular when it is adjusted against the yielding self-adjusting pins, the wheel, when finished, will have its groove or grooves truly formed relatively to the wheel axis and face, and that it is immaterial whether the bearing of the wheel in the rough be made exactly in the center or eccentric to the periphery or hub, as the groove, when finished, is concentric to the wheel bearing or axis, and its face properly turned relatively thereto.

I claim as my invention—

1. The chuck-disk or centering-head constructed, substantially as hereinbefore set forth, with yielding self-adjusting bearings, adapted to be fixed in position, against which bearings the wheel is pressed and secured in place upon the spindle.

2. The combination, substantially as hereinbefore set forth, of the chuck-disk or centering-head, its endwise-moving pins, the springs bearing against the pin-heads, and the set-screws for fixing the pins.

3. The combination, substantially as hereinbefore set forth, of the chuck-disk or centering-head, the self-adjusting, endwise-moving bearing-pins, adapted to be fixed in position in the head, and the spindle projecting in advance of said head, and adapted to receive the wheel to be turned, and admit of its being secured thereon against the bearing-pins.

In testimony whereof I have hereunto subscribed my name.

JOSEPH D. ALVORD.

Witnesses:
F. HURD,
A. W. HURD.